United States Patent [19]

Miller

[11] Patent Number: 4,756,551

[45] Date of Patent: Jul. 12, 1988

[54] HEAD RESTRAINT

[76] Inventor: Edward R. Miller, 5201 S. Main, Joplin, Mo. 64801

[21] Appl. No.: 4,892

[22] Filed: Jan. 20, 1987

[51] Int. Cl.⁴ .............................................. A47C 7/36
[52] U.S. Cl. .................................... 280/751; 297/391
[58] Field of Search ................ 280/748, 751; 297/391, 297/395

[56] References Cited

U.S. PATENT DOCUMENTS

| | | | |
|---|---|---|---|
| 1,234,571 | 7/1917 | Robideau | 297/391 |
| 3,292,726 | 12/1966 | Jette, Jr. | 180/82 |
| 3,526,428 | 9/1970 | Porsche et al. | 296/146 |
| 3,539,201 | 11/1970 | Loew | 296/28 |
| 3,640,572 | 2/1972 | Doehler | 297/390 |
| 3,704,031 | 11/1972 | Confer | 180/5 R |
| 3,904,223 | 9/1975 | Wilfert et al. | 296/28 R |
| 3,936,090 | 2/1976 | Aya et al. | 296/146 |
| 4,249,754 | 2/1981 | Best | 280/751 |
| 4,592,571 | 6/1986 | Bauman et al. | 280/756 |
| 4,607,886 | 8/1986 | Mazhar | 297/395 |

FOREIGN PATENT DOCUMENTS

| | | | |
|---|---|---|---|
| 1815856 | 7/1970 | Fed. Rep. of Germany | 297/391 |
| 2138151 | 2/1973 | Fed. Rep. of Germany | 297/391 |
| 11525 | 1/1977 | Japan | 297/391 |
| 118437 | 7/1984 | Japan | 297/391 |
| 422551 | 4/1967 | Switzerland | 280/748 |

*Primary Examiner*—Ross Weaver
*Attorney, Agent, or Firm*—Litman McMahon & Brown

[57] ABSTRACT

A head restraint is provided which includes a body having a flexible body casing, a layer of elastomeric material, a hollw tube, resilient filler within the hollow tube and a reinforcing rod embedded within the resilient filler. An appendage extends from the body and includes a flexible appendage casing which defines an appendage cavity for receiving a reinforcing bar. The appendage also includes a trim molding piece and is adapted for mounting on the rear wall of a pickup truck cab.

17 Claims, 1 Drawing Sheet

HEAD RESTRAINT

BACKGROUND OF THE INVENTION

The present invention relates generally to vehicle safety devices and in particular to a head restraint for pickup trucks.

DESCRIPTION OF THE PRIOR ART

The dangers of whiplash-type neck injuries to occupants of vehicles involved in collisions are well known. Consequently, head restraints have been mandatory safety equipment on passenger automobiles sold in this country since the 1960's. Head restraints are often integrally formed with the backs of the automobile seats and arrest the rearward travel of the occupants' heads in the event the vehicle suddenly accelerates forward, for example as a result of being struck from behind. Such head restraints are widely recognized as effective safety devices and are employed in various other vehicles such as buses, airplanes, etc.

However, pickup trucks are currently excluded from the head restraint requirement, and the occupants of those without head restraints are subject to a significant risk of head and neck injury.

Pickup truck drivers and passengers are subjected to another risk related to the absence of head restraints. Because the rear windows of many pickup trucks are relatively close to the seat backs, pickup truck occupants often sustain injuries when their heads strike the rear windows, particularly when the pickup trucks are suddenly accelerated as a result of being struck from behind.

One solution to these problems, of course, is to provide pickup truck seats with head restraints, as is commonly done in pickup trucks with individual, bucket-type seating. Head restraints may also be retrofitted to existing pickup truck seats, including bench-type seats. However, the head restraints on individual bucket-type seats offer no protection to passengers sitting between the seats. Also, head restraints on bench-type seats are not preferred because they add weight to the seat back and thus make it more difficult to fold back and forth. Furthermore, experience has shown that many vehicle manufacturers, in an effort to hold down production costs and remain competitive, include only the minimum of safety equipment required by law.

Yet another hazard associated with pickup trucks relates to the risk of the cab being crushed by a load in the pickup truck bed. For example, if a pickup truck collides head-on with an object or makes an emergency stop, the cargo, if not sufficiently restrained, may have sufficient momentum to crush the rear wall of the pickup truck cab or crash through the rear window.

SUMMARY OF THE INVENTION

In the practice of the present invention, a head restraint is provided for mounting on the rear wall of a pickup truck cab in front of a lower portion of the rear window. The head restraint includes a body and an appendage each covered by flexible outer casings enclosing body and appendage cavities within the body and appendage respectively. A layer of foam rubber is placed within the body cavity and includes a longitudinally-extending bore adapted to receive a hollow tube. A steel rod is placed within the hollow tube and imbedded in polystyrene filler. The appendage cavity receives a steel bar comprising a section of angle iron. A mounting flange includes a front trim molding piece and is mounted on the pickup truck cab rear wall.

OBJECTS OF THE INVENTION

The objects of the present invention are: to provide a head restraint for pickup trucks; to provide such a head restraint which is mountable on the rear wall of a pickup truck cab; to provide such a head restraint which extends across the cab of a pickup truck in front of a lower part of the rear window thereof; to provide such a head restraint which reinforces the rear wall of a pickup truck; to provide such a head restraint which reduces the risk of whiplash-type injuries to the occupants of pickup trucks; to provide such a head restraint which reduces the risk of pickup truck occupants striking their heads against pickup truck rear windows; to provide such a head restraint which is compatible with the style of a pickup truck interior; and to provide such a head restraint which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

Figure 1:
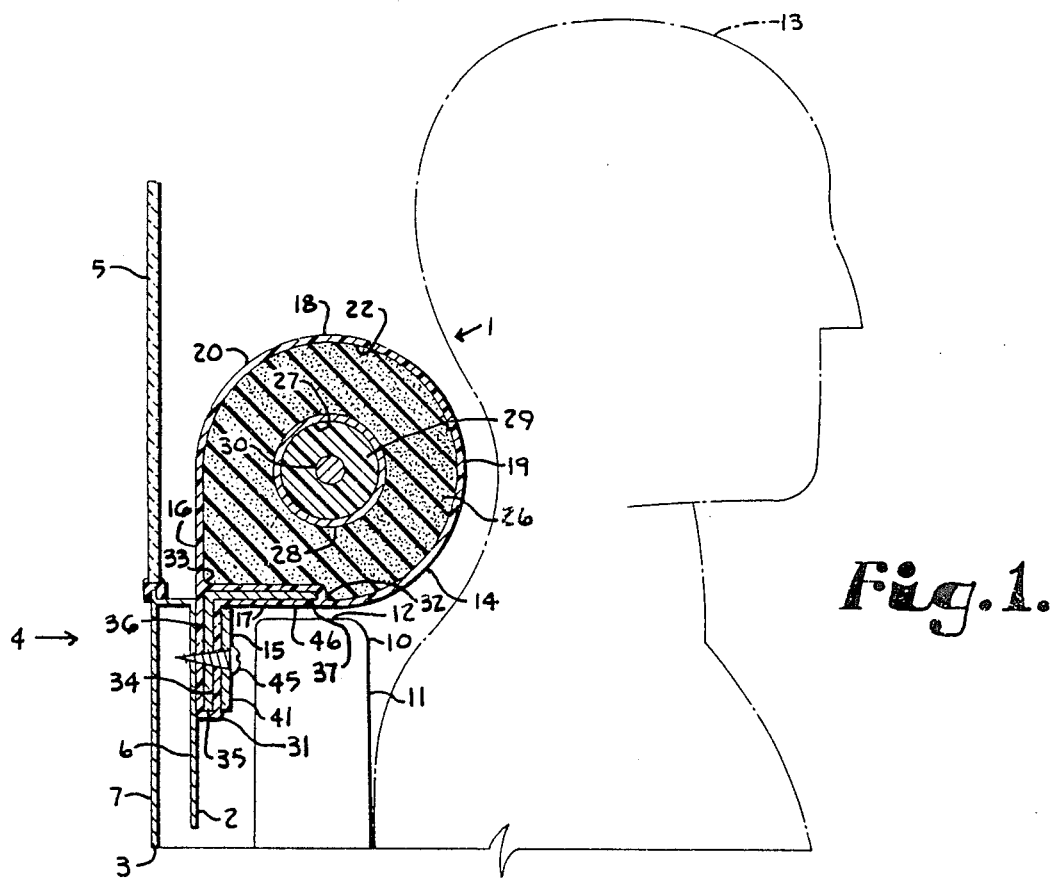
FIG. 1 is a vertical, cross-sectional view of a head retraint embodying the present invention and mounted on the rear cab wall of a pickup truck cab.
Figure 2:
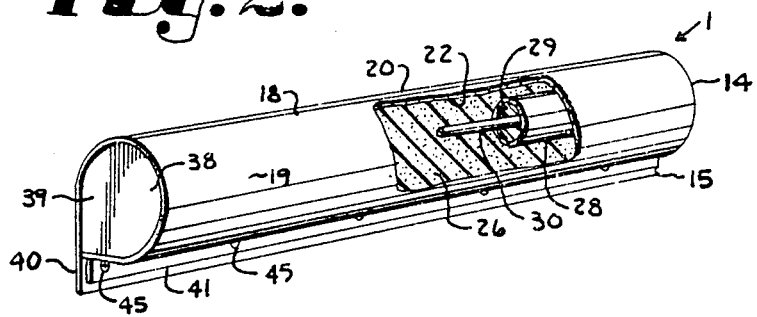
FIG. 2 is a perspective view of the head restraint.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

As described herein, the longitudinal orientation of the head restraint is transverse with respect to the pickup truck cab in which it is shown mounted. Front, back, up and down are oriented with reference to the pickup truck cab, i.e. to the right, left, top and bottom in FIG. 1.

Referring to the drawings in more detail, the reference numeral 1 generally designates a head restraint embodying the present invention and mounted on the inner panel 2 of the rear wall 3 of a pickup truck cab 4. The inner panel 2 extends across substantially the entire width of the pickup truck cab 4 below a rear window 5 and encloses an interior space 6 with a rear wall outer panel 7. The pickup truck cab 4 includes a seat 10 with a back 11 having a top 12 positioned slightly below the level of the rear window 5. An occupant 13 is shown in phantom in FIG. 1 in the seat 10.

The head restraint 1 generally comprises a body 14 and an appendage 15. The body 14 includes a relatively flat back 16 and a relatively flat bottom 17 which intersect at a substantially right dihedral angle. A top 18 and a front 19 of the body 14 approximately comprise portions of a cylinder.

A flexible body casing 20 comprises vinyl (as shown), leather, fabric or the like and encloses a body cavity 22. The body cavity 22 receives a layer 26 of elastomeric material such as foam rubber. A cylindrical bore 27 extends longitudinally through the elastomeric material layer 26 and receives a relatively lightweight, hollow tube 28 comprising, for example, aluminum or light-gauge steel. The tube 28 is filled with resilient, polystyrene filler 29 in which a rigid, steel rod 30 is imbedded.

The appendage 15 includes a flexible appendage casing 31 which is connected to the body casing 20 at front and back seams 32, 33. The appendage casing 31 encloses an appendage cavity 34 which receives a reinforcing bar 35 comprising a section of angle iron with a vertical leg 36 which is substantially parallel to the body back 16 and a horizontal leg 37 which is substantially parallel to the body bottom 19.

The head restraint 1 includes opposite ends 38 whereat the body cavity 22 is enclosed by respective casing end panels 39 and the appendage cavity 31 is sealed at seams 40. A trim molding piece 41 is placed in front of the reinforcing bar vertical leg 36 with a layer of the appendage casing 31 therebetween. The reinforcing bar 36, trim molding piece 41 and the appendage casing 31 are preferably predrilled to receive screws 45 extending therethrough and into the inner panel 2 of the pickup truck cab rear wall 3. Preferably, the head restraint 1 is mounted so that the body 14 thereof is positioned slightly above the top 12 of the seat 10, as shown in FIG. 1.

The relatively flat body bottom 19 and the reinforcing bar horizontal leg 37 cooperate to support the head restraint body 14 in the position as shown in FIG. 1, i.e. in spaced relation above the top 12 of the seat back 11. A space 46 between the head restraint body 14 and the top 12 of the seat 10 permits folding the seat back 11 forward and backward without interference from the head restraint 1.

The head restraint 1 protects the occupant 13 from injury in several ways. First of all, if the pickup truck accelerates suddenly, for example as a result of being struck from behind, the head of the occupant 13 tends to snap back relative to the pickup truck cab 4. Of course, this snapping back is caused by the body of the occupant 13 being accelerated more rapidly than the head. In the event of a severe blow from behind, the occupant 13 may be unable to prevent his or her head from snapping back relative to the pickup truck cab 4. As the head of the occupant 13 and the head restraint 1 collide, the body casing 20 and the foam rubber layer 26 absorb the initial impact. In the event of a particularly severe blow, the tube 28 would partially collapse, compressing the polystyrene filler 29 until the tube 28 contacted the steel rod 30. The steel rod 30 is designed to provide further resistance to bending of the head restraint 1. The occupant 13 is thereby less likely to sustain a whiplash-type injury and is also prevented from striking or being struck by the rear window 5.

The head restraint 1 also protects the occupant 13 from cargo in the pickup truck bed because the appendage 15, and particularly the steel bar 35 therein, reinforces the pickup truck cab rear wall 3. The head restraint body 14 provides secondary or backup resistance to a collapse of the rear wall 3 and also partly shields the occupant 13 from objects crashing through the rear window 5. Since the head restraint 1 extends across most of the width of the pickup truck cab 4, all of the occupants, including a person in the middle, are protected thereby.

Figure 3:
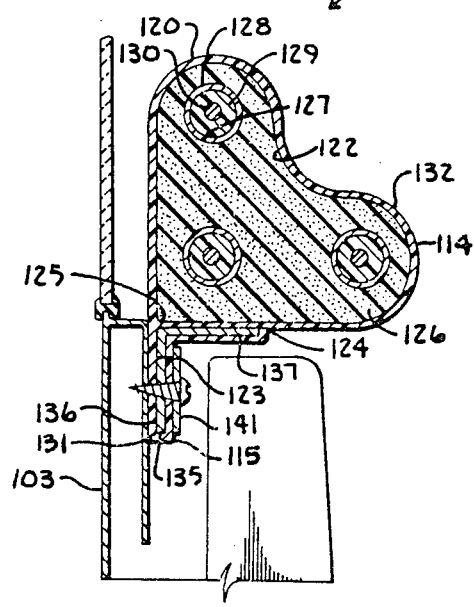
FIG. 3 is a vertical, cross-sectional view of a head restraint comprising a modified embodiment of the present invention.

A head restraint 101 comprising a first modified embodiment of the present invention is shown in FIG. 3 and is mounted on a pickup truck cab rear wall 103 in approximately the same location as the head restraint 1. The head restraint 101 includes a body 114 and an appendage 115. A body cavity 122 is enclosed by a body casing 120 and includes an elastomeric foam rubber layer 126 with three longitudinally-extending bores 127 each receiving a tube 128 with a steel rod 130 imbedded in resilient polystyrene filler 129.

An angle iron section 135 with vertical and horizontal legs 136, 137 is received in an appendage cavity 123 enclosed by an appendage casing 131 and extends between opposite ends of the head restraint 101. A trim molding piece 141 is placed in front of the angle iron section vertical leg 136 with a layer of the appendage casing 131 therebetween. The head restraint 101 protects the vehicle occupants from injury in a manner similar to the head restraint 1.

Figure 4:
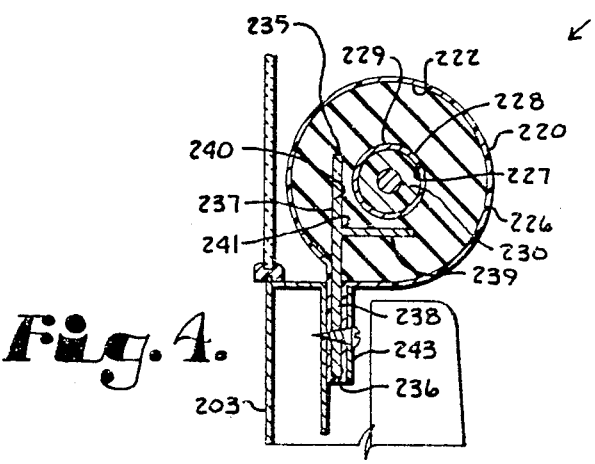
FIG. 4 is a vertical, cross-sectional view of a head restraint comprising a second modified embodiment of the present invention.

A head restraint 201 comprising a second modified embodiment of the present invention is shown in FIG. 4 and is mounted on a pickup truck cab rear wall 203 in approximately the same location as the head restraints 1 and 101. A body cavity 222 is enclosed by a body casing 220 and includes an elastomeric foam rubber layer 226 with a coaxial, longitudinally-extending bore 227 receiving a tube 228 with a steel rod 230 imbedded in resilient, polystyrene filler 229.

The second modified head restraint 201 differs from the head restraints 1 and 101 primarily with respect to a longitudinally-extending reinforcing and mounting section 235. The reinforcing and mounting section 235 includes a vertical leg 236 with upper and lower portions 237, 238 and a horizontal leg 239 projecting forwardly from the vertical leg upper portion 237. The vertical leg upper portion 237 is received in a T-shaped reinforcing and mounting section receiver 240 in the foam rubber layer 226.

A juncture 241 of the vertical and horizontal legs 236, 239 is located behind and below the central axis of the head restraint 201 which extends through the steel rod 230. The tube 228 is received in a right dihedral angle formed by the vertical and horizontal legs 236, 239, and has a diameter slightly greater than the front-to-back width of the horizontal leg 239 whereby the tube 228 projects forwardly from the horizontal leg 239. The head restraint 201 is mounted on the cab rear wall 203 in a manner similar to the head restraints 1 and 101 with a trim molding piece 243. In operation, the reinforcing and mounting section 235 functions to rigidly support the head restraint 201. In the event of an impact with an occupant of the vehicle, the vertical leg 236 is designed to flex rearwardly to absorb some of the energy of the impact. The horizontal leg 239, however, reinforces the reinforcing and mounting section 235 in a manner similar to the tube 228 and the steel rod 230.

It is to be understood that while certain forms of the present invention have been illustrated and described herein, it is not to be limited to the specific forms or arrangement of parts described and shown.

What is claimed and desired to be secured by Letter Patent is as follows:

1. A head restraint, which comprises:
   (a) a body including:
      (1) a flexible body casing enclosing a longitudinally-extending cavity;
      (2) a rigid reinforcement means extending longitudinally within said cavity; and
      (3) a resillient material positioned within said cavity between said body casing and said reinforcement means;
   (b) an appendage connected to and projecting from said body and extending longitudinally therewith, said appendage being adapted for mounting said head restraint and including a flexible appendage casing enclosing an appendage cavity; and
   (c) a longitudinally-extending horizontal reinforcing bar positioned within said appendage cavity.

2. The head restraint according to claim 1 wherein:
   (a) said reinforcing bar comprises a flat steel bar.

3. The head restraint according to claim 1 wherein:
   (a) said reinforcing bar comprises a section of angle iron.

4. The head restraint according to claim 1 wherein:
   (a) said resilient material between said body casing and said reinforcement means is elastomeric.

5. The head restraint according to claim 4 wherein:
   (a) said resilient material comprises foam rubber.

6. A head restraint, which comprises:
   (a) a body including:
      (1) a flexible body casing enclosing a longitudinally-extending cavity;
      (2) rigid reinforcement means extending longitudinally within said cavity and including a hollow tube, a reinforcement rod positioned within said hollow tube and a resilient fill material positioned between said reinforcing rod and said hollow tube; and
      (3) a resilient material positioned within said cavity between said body casing and said reinforcement means; and
   (b) an appendage connected to and projecting from said body and extending longitudinally therewith, said appendage being adapted for mounting said head restraint.

7. The head restraint according to claim 6 wherein:
   (a) said elastomeric material comprises foam rubber.

8. The head restraint according to claim 6 wherein:
   (a) said resilient material between said hollow tube and said reinforcing rod comprises polystyrene.

9. A head restraint, which comprises:
   (a) opposite ends;
   (b) a body including:
      (1) a flexible body casing;
      (2) a layer of elastomeric material positioned within said body casing and including a longitudinally-extending bore; and
      (3) a reinforcing member positioned within said bore and comprising a hollow tube;
   (c) an appendage including:
      (1) a flexible appendage casing; and
      (2) a reinforcing bar positioned within said appendage casing;
   (d) a longitudinally-extending, rigid, reinforcing rod positioned within said hollow tube; and
   (e) a resilient material positioned between said hollow tube and said reinforcing rod.

10. The head restraint according to claim 9 wherein:
    (a) said reinforcing bar comprises a flat steel bar.

11. The head restraint according to claim 9 wherein said body includes:
    (a) a plurality of bores extending longitudinally through said elastomeric material; and
    (b) a plurality of said reinforcing members positioned within said bores.

12. The head restraint according to claim 9, which includes:
    (a) opposite ends; and
    (b) said body casing including a pair of end panels each enclosing said body cavity at a respective end.

13. A head restraint, which comprises:
    (a) opposite ends;
    (b) a body including:
       (1) a flexible casing;
       (2) a layer of elastomeric material positioned within said body casing and including a longitudinally-extending bore; and
       (3) a reinforcing member positioned within said bore;
    (c) an appendage including:
       (1) a flexible appendage casing; and
       (2) a reinforcing bar positioned within said appendage casing; and
    (d) a longitudinally-extending, trim molding piece mounted on said appendage with a layer of said appendage casing between said reinforcing bar and said trim molding piece.

14. The head restraint according to claim 13, which includes:
    (a) a plurality of mechanical fasteners extending through said trim molding piece, said appendage casing and said reinforcing bar, said mechanical fasteners being adapted for mounting said head restraint.

15. In combination with a pickup truck including a cab with a rear wall including inner and outer panels and a rear window, the improvement of a head restraint, which comprises:
    (a) opposite ends;
    (b) a body including:
       (1) a flexible body casing enclosing a body cavity;
       (2) a layer of foam rubber positioned within said body casing and including a longitudinally-extending bore;
       (3) a relatively flat bottom;
       (4) a relatively flat back;
       (5) a top and a front approximately defining a portion of a cylinder;
       (6) a hollow tube positioned within said foam rubber layer bore;
       (7) a longitudinally-extending reinforcing rod positioned within said hollow tube; and
       (8) polystyrene filler material positioned between said hollow tube and said reinforcing rod;
    (c) an appendage including:
       (1) a flexible appendage casing enclosing a longitudinally-extending appendage cavity;
       (2) a longitudinally-extending reinforcing bar positioned within said appendage cavity and comprising a section of angle iron with a vertical leg substantially parallel with said body back and a horizontal leg substantially parallel with said body bottom in a supporting relationship with said body; and (3) a trim molding piece positioned in front of said reinforcing bar vertical leg with a portion of said appendage casing therebetween; and (d) a plurality of mechanical fasteners extending through said trim molding piece, said appendage casing, said reinforcing bar vertical leg and said pickup truck cab inner panel for mounting said head restraint on said pickup truck cab rear wall.

16. In combination with a pickup truck including a cab with a rear wall having inner and outer panels and a rear window, the improvement of a head restraint, which comprises:

(a) opposite ends;
(b) a body including:
  (1) a flexible body casing enclosing a body cavity;
  (2) a layer of foam rubber positioned within said body casing and including a longitudinally-extending bore;
  (3) a hollow tube positioned within said foam rubber layer bore;
  (4) a longitudinally-extending reinforcing rod positioned within said hollow tube;
  (5) polystyrene filler material positioned between said hollow tube and said reinforcing rod; and
  (6) a T-shaped reinforcing and mounting section receiver extending longitudinally through said foam rubber layer parallel to and in spaced relation from said body casing bore;
(c) a reinforcing and mounting section including:
  (1) a vertical leg with an upper portion received in said reinforcing and mounting section receiver and a lower portion projecting downwardly from said foam rubber layer;
  (2) a horizontal leg extending forwardly from said vertical leg upper portion and received in said reinforcing and mounting section receiver; and
  (3) a juncture between said vertical and horizontal legs, said juncture being positioned behind and below said hollow tube;
(d) an appendage including:
  (1) a flexible appendage casing enclosing said reinforcing and mounting section vertical leg lower portion; and
  (2) a trim molding piece positioned in front of said reinforcing and mounting section vertical leg lower portion with a portion of said appendage casing therebetween; and
(e) a plurality of mechanical fasteners extending through said trim molding piece, said appendage casing, said reinforcing and mounting section vertical leg lower portion and said pickup truck cab inner panel for mounting said head restraint on said pickup truck cab rear wall.

17. A head restraint, which comprises:

(a) opposite ends;
(b) a body including:
  (1) a flexible body casing;
  (2) a layer of elastomeric material positioned within said body casing and including a longitudinally-extending bore;
  (3) a reinforcing member positioned within said bore;
  (4) a relatively flat bottom; and
  (5) a reltively flat back; and
(c) an appendage including:
  (1) a flexible appendage casing; and
  (2) a reinforcing bar positioned within said appendage casing and comprising an angle section with vertical and horizontal legs, said vertical leg being substantially parallel with said body back and said horizontal leg being positioned below and substantially parallel with said body bottom in a supporting relationship with said body.

* * * * *